US012586377B2

(12) United States Patent
Ghazi et al.

(10) Patent No.: US 12,586,377 B2
(45) Date of Patent: Mar. 24, 2026

(54) SYSTEMS AND METHODS TO PREDICT AGGRESSION IN SURVEILLANCE CAMERA VIDEO

(71) Applicant: Robert Bosch GmbH, Stuttgart (DE)

(72) Inventors: Irtsam Ghazi, Pittsburgh, PA (US); Alessandro Oltramari, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 18/392,872

(22) Filed: Dec. 21, 2023

(65) Prior Publication Data

US 2025/0209819 A1 Jun. 26, 2025

(51) Int. Cl.
| | |
|---|---|
| *G06V 20/52* | (2022.01) |
| *G06V 10/86* | (2022.01) |
| *G06V 20/40* | (2022.01) |
| *G06V 20/70* | (2022.01) |
| *H04N 7/18* | (2006.01) |
| *G06V 10/774* | (2022.01) |

(52) U.S. Cl.
CPC .............. *G06V 20/52* (2022.01); *G06V 10/86* (2022.01); *G06V 20/41* (2022.01); *G06V 20/70* (2022.01); *H04N 7/183* (2013.01); *G06V 10/774* (2022.01); *G06V 2201/10* (2022.01)

(58) Field of Classification Search
CPC ........ G06V 20/52; G06V 20/70; G06V 10/86; G06V 20/41; G06V 10/774; G06V 2201/10; H04N 7/183
See application file for complete search history.

(56) References Cited

U.S. PATENT DOCUMENTS

| | | | |
|---|---|---|---|
| 2008/0019566 A1* | 1/2008 | Niem ...................... | G06V 20/54 |
| | | | 382/103 |
| 2018/0053394 A1* | 2/2018 | Gersten .................. | G08B 17/08 |
| 2019/0295393 A1* | 9/2019 | Lee .......................... | G06F 16/73 |
| 2021/0256061 A1* | 8/2021 | Janakiraman ......... | G06F 16/738 |
| 2021/0383193 A1* | 12/2021 | Navoni .................. | G06N 3/042 |
| 2024/0013559 A1* | 1/2024 | Sidak ..................... | G06V 20/68 |
| 2024/0303985 A1* | 9/2024 | Kawakami .............. | H04N 7/18 |

* cited by examiner

*Primary Examiner* — Sunghyoun Park

(57) ABSTRACT

Methods and systems for predicting aggressive behavior associated with a surveillance scene. Images are generated from a camera of a surveillance scene, and audio is also generated. A local computing system executes an object classification model on the images to predict one or more classes of objects in the scene. The local computing system also executes a sound-event detection model on the audio to predict one or more classes of events occurring in the scene. Metadata is generated associated with the image-based classes and audio-based classes. The metadata is transferred to a remote computing system that executes a knowledge graph on the metadata to implement knowledge graph-based reasoning to predict aggressive behavior occurring in the surveillance scene based on the metadata. The metadata associated with the predicted aggressive behavior is labeled as such, and control commands are output accordingly.

18 Claims, 3 Drawing Sheets

SYSTEMS AND METHODS TO PREDICT AGGRESSION IN SURVEILLANCE CAMERA VIDEO

TECHNICAL FIELD

The present disclosure relates to systems and methods to predict aggression in surveillance camera video.

BACKGROUND

Surveillance cameras are becoming more prevalent in today's world. With the advent of Artificial Intelligence (AI) enabled cameras, new possibilities have opened to utilize these cameras in multi-sensor scenarios for advanced detection of possible behaviors. Often this advanced detection includes the ability to detect certain events individually, generalize and reason over them, and to holistically understand the environmental context. However, it is not possible to always have human oversight in all these surveillance video management systems, nor it is possible to completely benefit from large AI models in the context of these camera systems as they do not have enough computing power to run complex models.

SUMMARY

In an embodiment, a method for predicting aggressive behavior associated with a surveillance scene. Images are generated from a camera of a surveillance scene, and audio is also generated. A local computing system executes an object classification model on the images to predict one or more classes of objects in the scene. The local computing system also executes a sound-event detection model on the audio to predict one or more classes of events occurring in the scene. Metadata is generated associated with the image-based classes and audio-based classes. The metadata is transferred to a remote computing system that executes a knowledge graph on the metadata to implement knowledge graph-based reasoning to predict aggressive behavior occurring in the surveillance scene based on the metadata. The metadata associated with the predicted aggressive behavior is labeled as such, and control commands are output accordingly.

DETAILED DESCRIPTION

Figure 1:
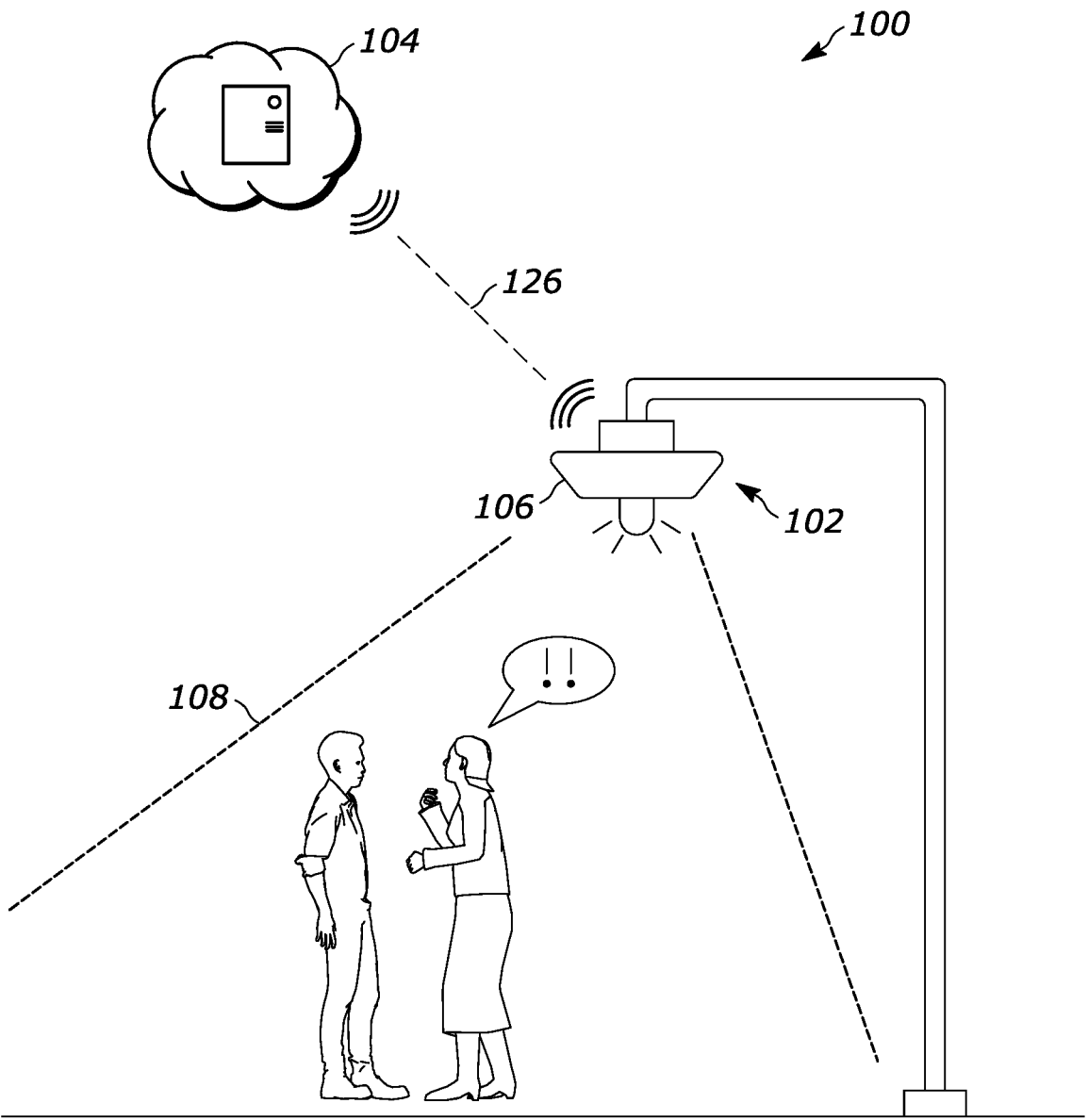
FIG. 1 is a schematic of a system for predicting aggressive behavior associated with a surveillance scene, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Audio- and video-based classification models have evolved over time to the extent whereby human level classification of events in both modalities has become possible. Most self-driving cars use video classification models such as MobileNet, Yolo etc., to detect image-based objects in the environment. In a similar way, audio-based detectors have also become prevalent that allow detection for events such as gunshots, intrusion alarms, screams, loud sounds. Depending on indoor or outdoor contexts, there can be a variety of sounds of interest that provide information and insight about the surroundings of the camera.

Audio- and video-based classification models developed to perform event detection run on embedded real time systems, which have limited computing resources. This means that those classification models are constrained to process events at a small temporal scale. To elaborate further, this means that it might only be possible to analyze images at a limited resolution and frame rate (e.g., 8-15 frames per second) and audio of short duration (e.g., 2 seconds).

However, to disambiguate events in real-world environments, spatial and temporal properties of salient, neighboring events should be factored in, which add more insight by broadening the context of observation. As an example, a crime scene involving a car collision might require two events occurring in relative temporal proximity, such as tire screeching and loud collision sound. Similarly, detecting aggressive behavior can be a precursor to—thus, a predictor of—violent situations. Violent situation may involve distinct environmental cues at a varying degree of intensity: there can be gunshots, screaming, angry shouts, loud thuds, crying, utterances of keywords such as "help", "leave me alone", glass breaks, etc. In addition, visual cues from the scenes such as frantic gesturing, presence of gun or other weapons such as knives, can indicate possible violent situations. Although it may be relatively easy to train standalone audio-based model capable to detect these classes of events, in conjunction with training a video-based model that supports gun detection, it is rather unfeasible to use them for real-time processing in state-of-the-art camera devices. The primary reason for this is that computing power in a camera is limited: the more temporal data are required to accurately understand a scene, the larger the required RAM and computing power of the device. State of the art devices and models, as an example, cannot process more than 3-4 seconds of audio in a multi-detection scenario. This limitation hinders the capability of an artificial intelligence (AI) system to accurately understand a scene.

Therefore, in the context of these constraints, this disclosure provides methodologies and frameworks for deploying multiple classification models for audio and video information into networked cameras that will relay the metadata to a central system consisting of an edge server running a knowledge graph and a query-based inference engine. Methods and systems for predicting aggressive behavior associated with a surveillance scene are provided that utilize these multiple classification models and knowledge graph-based query engine. In embodiments, metadata from cameras are aggregated using a domain-specific semantic schema or ontology, thus instantiating a knowledge graph of audio-video micro-events (e.g., 3-4 seconds) pertaining to specific locations. Also in embodiments, reasoning over such micro-events provides an inference as to macro-events which correspond to activities or behaviors of interest occurring in the surveillance scene over an extended period of time.

References herein to an image sensor are intended to refer to any sensor configured to generate images or video of a particular scene. Non-limiting examples of an image sensor include a camera, lidar, radar, infrared camera, a short-, medium-, or long-range thermal imaging sensor, a millimeter radar sensor, a sonar sensor (e.g., an ultrasonic sensor), etc.

References herein to an audio sensor are intended to refer to any sensor configured to generate audio or audio data of a particular scene. Non-limiting examples of an audio sensor include a microphone, which can include a microphone array including multiple microphone units.

Sensor data may refer to any suitable image data, a plurality of data points of a lidar sensor, a plurality of data points of a millimeter radar sensor, a plurality of data points of a sonar sensor, a plurality of data points of a thermal image, or the like. Image data may refer to digital images of a digital camera sensor, elements of digital images (e.g., pixels or groups of pixels), a frame of video, or the like.

References herein to "local" or "remote" processor refer to the relationship with the image sensor and audio sensor. For example, a "local processor" can refer to a processor that is local to the image sensor and/or audio sensor in that it operates within the same physical system or device where the audio or image data is generated or where the local software applications are running. In contrast, a "remote processor" or "remote server" can refer to a processor or server that is remote from the image sensor and/or audio sensor in that it operates on a different system or device, or is located elsewhere and accessed through a network. As an example, a local computing system includes a processor directly connected with (e.g., on-board, within the same structural unit as, etc.) the image sensor and/or audio sensor. The images captured are sent directly to this processor within the local computer system, rather than through external communications (e.g., long range, wireless, Internet, etc.). In contrast, a remote computing system or remote server includes a processor that is physically remote from the image sensor and/or audio sensor, and receives the image data and/or audio data through a secured wired and/or wireless connection with the local computing system.

Figure 2:
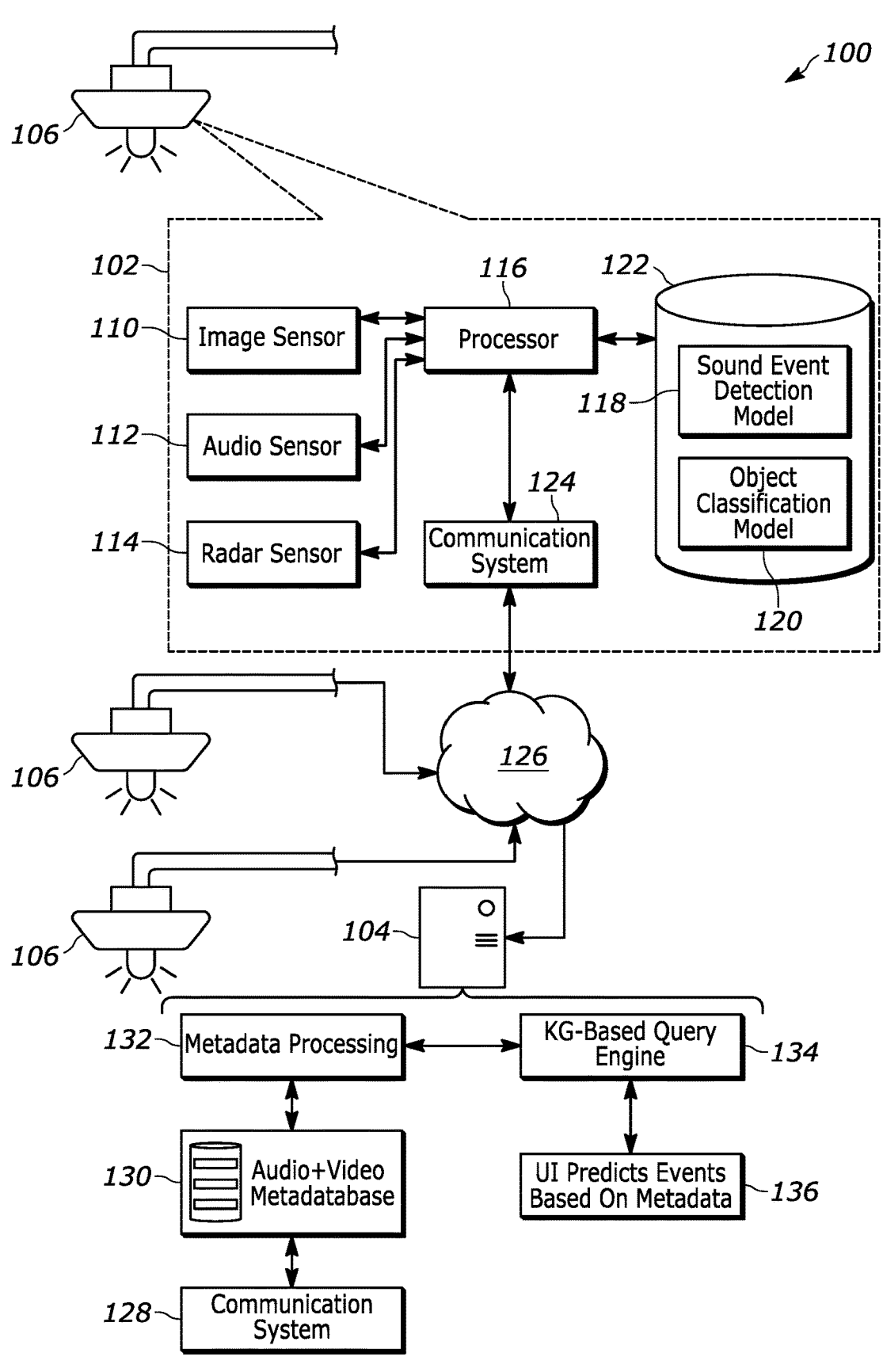
FIG. 2 is a more detailed schematic of the system of FIG. 1, according to an embodiment.

Turning now to the Figures, in which like reference numerals indicate like or similar functions or features, FIG. 1 illustrates a general schematic of a system 100 for predicting aggressive behavior associated with a surveillance scene, and FIG. 2 illustrates a more detailed schematic of the system 100, according to embodiments. The system includes a local computing system 102 in communication with a remote computing system 104. The local computing system 102 can include processor(s) and associated memory are local to a surveillance unit 106. The surveillance unit 106 can include an image sensor 110 (e.g., camera) and audio sensor 112 (e.g., microphone), and is configured monitor and surveil a surveillance scene 108. For example, the image sensor 110 can generate images and/or image data associated with a field of view (FoV) that represents all or part of the surveillance scene. Likewise, the audio sensor 112 can generate audio and/or audio data associated with audible actions that take place in or around the surveillance scene.

The surveillance unit 106 can also include multiple image sensors and/or multiple audio sensors. Additional sensors may also be provided. For example, a radar sensor 114 may generate radar data associated with the surveillance scene 108. As mentioned above, the radar sensor may be referred to as a type of image sensor. Other sensors may be provided such as lidar, infrared, and the like as described above.

The surveillance unit 106, by way of its image sensor 110 and audio sensor 112, is configured to keep surveillance over the surveillance scene 108 to activity that occurs therein, including aggression or aggressive behavior. This can include two individuals yelling at one another, attacking one another, wielding a weapon such as a gun, knife, or baseball bat, or other audible or visual activities described further herein.

The local computing system 102 includes a local processor 116. The processor 116 may refer to one processor or multiple processors, and may be any suitable device that receives, for processing, the data generated by the sensors 110, 112, 114. The processor 116 may be programmed to process and/or execute digital instructions to carry out at least some of the tasks described herein. In embodiments, the processor includes processor hardware (shared, dedicated, or group) that executes code, in communication with memory hardware (shared, dedicated, or group) that stores code executed by the processor hardware. The processor may include one or more devices selected from microprocessors, micro-controllers, digital signal processors, micro-computers, central processing units, field programmable gate arrays, programmable logic devices, state machines, logic circuits, analog circuits, digital circuits, or any other devices that manipulate signals (analog or digital) based on computer-executable instructions residing in memory. The memory accessed by the processor 116 may include a single memory device or a plurality of memory devices including, but not limited to, random access memory ("RAM"), volatile memory, non-volatile memory, static random-access memory ("SRAM"), dynamic random-access memory ("DRAM"), erasable programmable read-only memory (EPROM), electrically erasable programmable read-only memory (EEPROM), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, e.g., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The processes and logic flows described in this specification can be performed by one or more programmable processors 116 executing one or more computer programs to perform actions by operating on sensor data and generating output. The processes and logic flows can also be performed by, and apparatus can also be implemented as, special purpose logic circuitry, e.g., a field programmable gate array ("FPGA") or an application specific integrated circuit ("ASIC").

The processor 116 is also configured to execute a sound event detection model 118 and an object classification model 120, both of which can be maintained in or held by memory 122 (examples of which are described above).

The sound event detection model 118 can implement audio classification or acoustic event detection. The model 118 uses audio data generated by the audio sensor 112 to identify and categorize different sounds or events present in the audio. In embodiments, the sound event detection model 118 implements audio representation, whereby audio signals are converted into numerical representations that machine learning models can process. This can include the use of spectrograms (e.g., visual representations of the frequencies of a sound signal over time, created using Short-Time Fourier Transform (STFT)), or Mel-frequency cepstral coefficients (MFCCs). Then, feature extraction is implemented extracting meaningful features from the audio representations. These features could include frequency components, amplitude variations, temporal characteristics, etc. CNNs can be adapted for audio processing by treating audio representations (like spectrograms) as images. The CNN layers learn hierarchical representations of sound events, capturing patterns and features across different frequency and time domains. Recurrent Neural Networks (RNNs) or Long Short-Term Memory (LSTM) networks can be used by the sound event detection model 118 due to their ability to capture temporal dependencies in sequential data like audio. They can model long-range dependencies and capture the context of sound events over time. Hybrid models may combine CNNs for feature extraction from spectrograms or other representations and then feed those features into RNNs or LSTM networks for temporal modeling. An attention mechanism can be used for focusing on specific parts of the audio sequence, emphasizing important features, and improving the accuracy of event classification. Similar to image-based models, the sound event detection model 118 can be trained using labeled datasets. During training, the model learns to differentiate between different sound events or classes. Classification involves predicting the category or type of sound event present in a given audio clip.

In embodiments of the sound event detection model 118, the model can rely on predefined classes that can include, for example, identification of a sound as a person talking, a person yelling, glass breaking, a car crash, a person laughing, a gunshot, a fire alarm, and the like. By comparing the sound detected by the audio sensor 112 to predefined classes, the sound event detection model 118 can predict, with an identified certainty, the class of sound detected by the audio sensor 112.

The object classification model 120 is a computer vision model configured to identify and categorize objects within the images or video generated by the image sensor 110, or other image sensors of the local computing system 102. The object classification model 120 relies on and implements neural networks and deep learning techniques, such as convolutional neural networks (CNNs), in embodiments.

In one embodiment, the object classification model 120 includes MobileNet, e.g., MobileNetV1, MobileNetV2, MobileNetV3, etc. MobileNet is configured for mobile and embedded vision applications and employs depthwise separable convolutions to reduce computation while preserving accuracy. With depthwise separable convolutions, MobileNet separates standard convolutions into two layers—depthwise convolutions and pointwise convolutions—to reduce the number of parameters and computational complexity. With depthwise convolution, it applies a single filter to each input channel separately. With pointwise convolution, it performs a 1×1 convolution to combine the outputs of depthwise convolutions across channels. As the image passes through the network, each layer extracts and transforms the input into higher-level representations. These representations gradually encode more complex and abstract features of the image. MobileNet can also utilize Rectified Linear Unit (ReLU) activation functions after most layers of the neural network, which, combined with batch normalization, aids in the training process and network performance. The final layers (or layers after the convolutional layers) of the neural network can include a global average pooling layer and a fully connected layer to perform classification. This averages the feature maps spatially, reducing the spatial dimensions and aggregating the important features. Finally, the processed features from the convolutional layers are fed into fully connected layers, followed by a softmax activation function. The softmax function outputs a probability distribution over the predefined classes/categories.

During training, MobileNet is trained on a dataset with labeled images using techniques like backpropagation and gradient descent. It learns to adjust its parameters (weights and biases) to minimize the difference between predicted and actual labels.

During inference (e.g., when the model is deployed to classify new, unseen images such as images of the surveillance scene), the trained MobileNet takes an image as input and performs forward propagation through its layers to generate predictions. The output includes of class probabilities, indicating the likelihood of the input image belonging to different predefined classes.

In another embodiment, the object classification model 120 includes You Only Look Once (YOLO), such as YOLOv1, YOLOv2, YOLOv3, etc. YOLO is an object detection and classification model that not only localizes object within an image but also classifies them. YOLO divides the input image into a grid of cells. Each cell in the grid is responsible for predicting bounding boxes and class probabilities. Unlike some other object detection methods, YOLO performs predictions directly on this grid in one pass through the network. Anchor boxes (e.g., predetermined bounding box shapes and sizes) can be relied upon to assist in predicting accurate bounding box coordinates for objects of various shapes and sizes within each grid cell. Rather than using multiple stages or region proposals, YOLO makes predictions for bounding boxes and class probabilities directly from the grid cells in a single pass through the network. Each grid cell predicts multiple bounding boxes along with class probabilities for those boxes. The architecture uses a backbone network (e.g., Darknet-53 in YOLOv3) to extract features from the input image. These features are passed through convolutional layers to capture both low-level and high-level features. Convolutional layers within the network learn to predict bounding box coordinates (e.g., x, y, width, height) relative to the grid cells. YOLO predicts bounding boxes with respect to each grid cell, combining predictions across the entire image. In addition to bounding box predictions, YOLO assigns class probabilities to each bounding box. It predicts the probability of each predefined class for each bounding box, indicating the likelihood that the detected object belongs to a specific class.

During training, YOLO optimizes its parameters by minimizing a combined loss function, which includes components for localization error (bounding box coordinates) and classification error (class probabilities). Techniques like backpropagation and gradient descent are used to update the neural network's weights.

During inference, YOLO takes an input image, passes it through the trained network, and generates bounding boxes along with class probabilities for objects detected within the image.

In these described embodiments or other embodiments of the object classification model 120, predefined classes relied upon by the object classification model 120 can include, for example, identification of an object as a person, an animal, a bicycle, a vehicle, and the like. Additionally, the classes can include things that may be relevant for aggressive actions (e.g., fighting, break-ins etc.), such as a gun, a baseball bat, a hammer, a fire, and the like.

During execution of the sound event detection model 118 and the object classification model 120, corresponding metadata is generated. For example, the local computing system 102 can generate metadata associated with the sound executed by the sound event detection model 118, and can generate metadata associated with the images executed by the object classification model 120. This metadata can be generated locally at the local computing system 102 (e.g., by one or more processor 116) and can be stored locally at the computing system 102 (e.g., within memory 122 or other memory or storage).

In embodiments, the metadata generated by the local computing system 102 regarding the audio can include as follows. Execution of the sound event detection model 118 can yield a timestamp of the audio event occurring, for example starting at time x and ending at time y, and/or the overall length of the audio event. Execution of the sound event detection model 118 can also yield one or more audio classes that the sound event belongs to, along with a score or rating of confidence by the sound event detection model. The labels of these classes can be part of the stored metadata. These classes can include, for example, screaming, laughing, gunshot, fire alarm, or the presence of certain key aggression words like "kill," "beat," "hurt," or the like. The sound event detection model 118, upon execution, can predict the detected sound as belonging to one or more of these classes, along with the associated confidence score of that predicted class. The score can be on a 0 to 1 scale, for example. The metadata can also include identification information regarding the audio sensor 112, such as the serial number, whether the audio sensor is indoor or outdoor, and what image sensor 110 the audio sensor 112 is associated with (e.g., local to). The metadata can also include locational information of the sound. For example, the audio sensor 112 may include multiple microphones in an array, and signal processing techniques such as beamforming can be utilized in which a specific direction or location from which sound is arriving is determined. The determined direction or angle of the sound can be stored as metadata. Other forms of metadata are contemplated, and the above is merely exemplary.

In embodiments, the metadata generated by the local computing system 102 regarding the images can include as follows. Execution of the object classification model 120 can yield a timestamp of the object being detected in the video stream or image data, for example starting at time x and ending at time y, and/or the overall length of time that the object is in the field of view of the image sensor. Execution of the object classification model 120 can also yield one or more classes that the objects belong to, along with a score or rating of confidence by the object classification model 120. The labels of these classes can be part of the stored metadata. These classes can include, for example, the object being detected as a person, a bicycle, a vehicle, a weapon (e.g., gun, baseball bat, knife, etc.). The object classification model 120, upon execution, can predict the detected object as belonging to one or more of these classes, along with the associated confidence score of that predicted class. The score can be on a 0 to 1 scale, for example. The metadata can also include identification information regarding the image sensor 110, such as the serial number, whether the image sensor is located indoor or outdoor, whether the field of view is indoor or outdoor, and what audio sensor 112 the image sensor 110 is associated with (e.g., local to). The metadata can also include locational information of the detected object, such as coordinates relative to the image sensor for example. The object classification model 120 can also predict (e.g., with a confidence score) whether an identified person is acting in an out-of-the-ordinary manner or anomalous fashion. This can be based on movement of the person at a particular speed, or in a back-and-forth manner, or raising an arm with an object in-hand, or the like. One or more of these acts or others, as detected by the object classification model 120, can result in a label placed on that detected person as being out of the ordinary or anomalous. These particular actions can then be determined to be aggressive or not by the knowledge graph described further herein. Other forms of metadata are contemplated, and the above is merely exemplary.

The local computing system 102 also includes a communication system 124. The communication system 124 may include electronic circuity (and/or programmed/programmable software) to facilitate wired communication, wireless communication, or both. For example, communication system 124 may comprise a wireless chipset for short-range (e.g., Wi-Fi, Bluetooth, etc.) wireless communication or long-range (e.g., cellular, satellite, etc.) wireless communication. Further, the communication system 124 may comprise a wired interface having a port so that a trained technician physically may connect a service computer to the port and download protected personal and/or non-personal data from memory. Other aspects of communication system 124 also are contemplated herein. The communication system 124 is configured for compatibility with a communication network. The communication network 126 may comprise public or private telephony infrastructure, cable communication infrastructure, cellular tower and base station infrastructure, satellite and satellite base station infrastructure, and/or the like. In an embodiment, the communication network 126 is of a particular communication protocol configured to transfer metadata, such as a Message Queuing Telemetry Transport (MQTT) messaging protocol. In such an embodiment, the communication system 124 includes an appropriate chipset for MQTT messaging protocol.

As shown in FIG. 2, the system 100 may include multiple surveillance units 106, each surveillance unit having its own respective local computing system 102, and each surveillance unit being connected to network 126.

The remote computing system 104 is also connected to the communication network 126. As such, the remote computing system 104 can include an appropriate communication system to facilitate such communication. In embodiments, the communication network 126 and the communication systems of both the local computing 102 and the remote computing system 104 enable the communication of data (e.g., metadata described herein), instructions, control commands, and the like from the local computing system 102 to the remote computing system 104.

The remote computing system 104 may be a server, such as an edge server. As such, the remote computing system 104 has its own processor, memory, and the like which may embody the descriptions of the processors and memory described above. An "edge server" is a type of server that is positioned closer to the end-users or endpoints of a network, typically at the edge of a larger network infrastructure. Unlike traditional servers located in centralized data centers, which are often distant from end-users, edge servers are strategically placed at the edge of the network, closer to where data is being generated, consumed, or processed. The edge server also enables various edge computing applications by processing data locally, which can be critical in surveillance scenarios requiring real-time analysis or immediate actions to be taken based on the generated image data and/or audio data.

In embodiments, the remote computing system 104 includes a communication system 128. The communication system 128 can include similar structure as that described above with respect to communication system 124. The communication system 128 is configured to receive, via network 126, image or video data generated by the image sensor 110, audio data generated by the audio sensor, and data generated or output by the sound event detection model 118 and object classification model 120. The data received by the communication system 128 can also include any and all metadata associated with the sound event detection model 118 and the object classification model 120. In short, the communication system 128 can communicate to the communication system 124 of the local computing system 102 via network 126 to receive data generated by the local computing system 102.

The metadata received from the local computing system 102 can be stored in an audio and video meta database 130. The meta database 130 can include suitable storage and/or memory such as the examples described elsewhere herein. For example, the meta database 130 can be or include components of an edge server, or other type of server. The metadata stored in the meta database 130 can be utilized by a metadata processing system 132 for processing. The metadata processing system 132 can be or include one or more processors executing instructions stored on one or more memory units, and can also be part of the edge server for example.

In embodiments, the metadata processing system 132 is configured to execute a knowledge graph with a query-based inference engine, also referred to as a knowledge graph-based query engine 134. The knowledge graph-based query engine 134, when executed, is configured to infer specific environmental activities and/or behaviors, such as aggression, based on the audio metadata and the image/video metadata. The edge server, being able to run a knowledge graph and a query-based inference engine at 134, can enhance event-based recognition by extending spatiotemporal reasoning capabilities.

In general, a knowledge graph is structured way of organizing information to establish relationships between different entities. It represents knowledge in a format that a computer system can understand, allowing it to connect various data points and derive insights from these connections. When it comes to the audio and video metadata disclosed herein, the knowledge graph can be used to extract information from the audio and video metadata. For example, the knowledge graph can store the metadata disclosed above, such as keywords, predicted audio events, predicted video events, predicted audio classes, predicted object classes, and the like.

The knowledge graph can be executed to detect aggression in combined audio and video surveillance data. In embodiments, the created knowledge graph structures the data, extracts relevant features, and defining relationships between entities. For example, the remote computing system 104 can extract features from the transferred metadata related to speech patterns, tone, volume, or specific keywords, and the like as described above. Likewise, the remote computing system 104 can extract features like facial expressions, body language, movements, object interactions, and the like from the video metadata. These extracted features can be stored and organized in the knowledge graph. Each entity, attribute, class, or detected feature can become a node in the knowledge graph. Relationships and connections between nodes represent various interactions, associations, or correlations. For instance, an edge might connect a person node to an action node (e.g., "fighting") and a location node (e.g., "hallway"). Nodes and edges might have properties describing their attributes, timestamps, confidence levels, etc. Machine learning within the knowledge graph-based query engine can analyze the structured data in the knowledge graph. This can involve models like neural networks, decision trees, support vector machines (SVMs), or deep learning architectures (e.g., convolutional neural networks—CNNs, recurrent neural networks—RNNs) or the like. These models could learn from labeled examples of aggressive behavior to predict and identify patterns. The models can use these learned patterns to make predictions about whether the observed behaviors constitute aggression, considering the combined evidence from both audio and video data. The models can be trained, in which the model's predictions are validated against known instances of aggression or non-aggression to assess the model's accuracy.

Utilizing a query engine alongside the knowledge graph at 134 enables users to ask specific questions to make inquiries about the data stored within the graph. For example, a user (either human or automated) may ask "was there any aggression in the storefront on Monday afternoon?" After suitable transformation into a computational query, in response, the knowledge graph, coupled with the query engine, can be used to predict the answer by leveraging the structured information stored within the graph. For example, the query engine may accept natural language queries, which may include a question of a particular type of aggression sought, and a particular time or place under surveillance. This query is then broken down into its semantic components in order to identify key entities, time references, and the specific type of information requested (e.g., aggression in the storefront on Monday). Transformation of natural language questions into computational queries can be programmatically executed via template-based mappings, or using large language models: the former method may be sufficient for factual questions, whereas large language models can be used to obtain more flexible adaptation to a user's language and vocabulary. The query engine interacts with the knowledge graph to retrieve relevant information. For example, it starts by traversing the graph based on the entities mentioned in the query (e.g., storefront, aggression) and the specified time frame (Monday). The engine uses graph traversal algorithms to look for patterns and relationships between entities, leveraging the structured relationships and connections within the knowledge graph. Given this example, Information related to aggression instances, storefront activities, and timestamps is retrieved from the graph. Based on the collected data and established patterns, the system predicts whether aggression occurred in the storefront on Monday. This prediction utilizes the historical data and relationships stored in the graph. The query engine consolidates the findings and presents the answer or insights derived from the knowledge graph in a human-understandable format. It might be a simple "yes/no" response, a table, or a more detailed report outlining instances of aggression or lack thereof, along with the relevant video data or audio data that corresponds to the aggressive act in question.

The knowledge-graph query engine 134 may also utilize a multi-modal knowledge graph that incorporates the metadata from multiple modes or sources, such as audio, video, radar, etc. within a single graph structure. The knowledge graph can encompass nodes and edges representing various types of data, including both audio and video along with other modalities. Edges within the graph can establish connections or relationships between audio and video nodes when they relate to the same context or event. For example, an edge might connect a person node (from video data) to their corresponding speech node (from audio data) when the person is speaking. Another edge might connect an action node (from video data) to a related sound node (from audio data) when a specific action corresponds to a sound cue, like a breaking glass or a loud shout. Integration of multiple modalities allows for cross-modal fusion, where information from one modality supplements or enriches understanding in another, enhancing the overall analysis and inference capabilities.

The results of the knowledge graph-based query engine 134 can be outputted to a user interface 136. The user interface 136 displays or otherwise informs a user of the predicted events. For example, if the knowledge graph and associated query engine determine that an act of aggression occurred at a certain time at a certain place, the video of that event and the sound of that event can be retrieved from storage and displayed visually and/or audibly to the user by the user interface 136.

The display on the user interface 136 can be considered one type of control command issued by the system. Other types of control commands can include storing or labeling the audio data and/or video data as aggressive so that it can be recalled later. This could be helpful in surveillance areas that recall video later, such as a retail store for example. Another example of a control command issued is triggering of an alarm to alert a user that there is aggressive actions taking place. The alarm can be a siren or other loud audible noise to break up a fight, for example. Or, the alarm can be an alert sent to an educational professional such as a teacher or a principal of a school so that the school can learn about the aggressive acts and discuss with the students in question. Another example of a control command issued is to use these aggressive moments for training of another model to determine when aggressive acts take place. For example, the audio data and video data can be segregated and stored in storage, and relied upon as training data for another model. The control command can also be issued by the remote computing system, or can instruct the local computing system to perform an action, such as generate the alarm.

Figure 3:
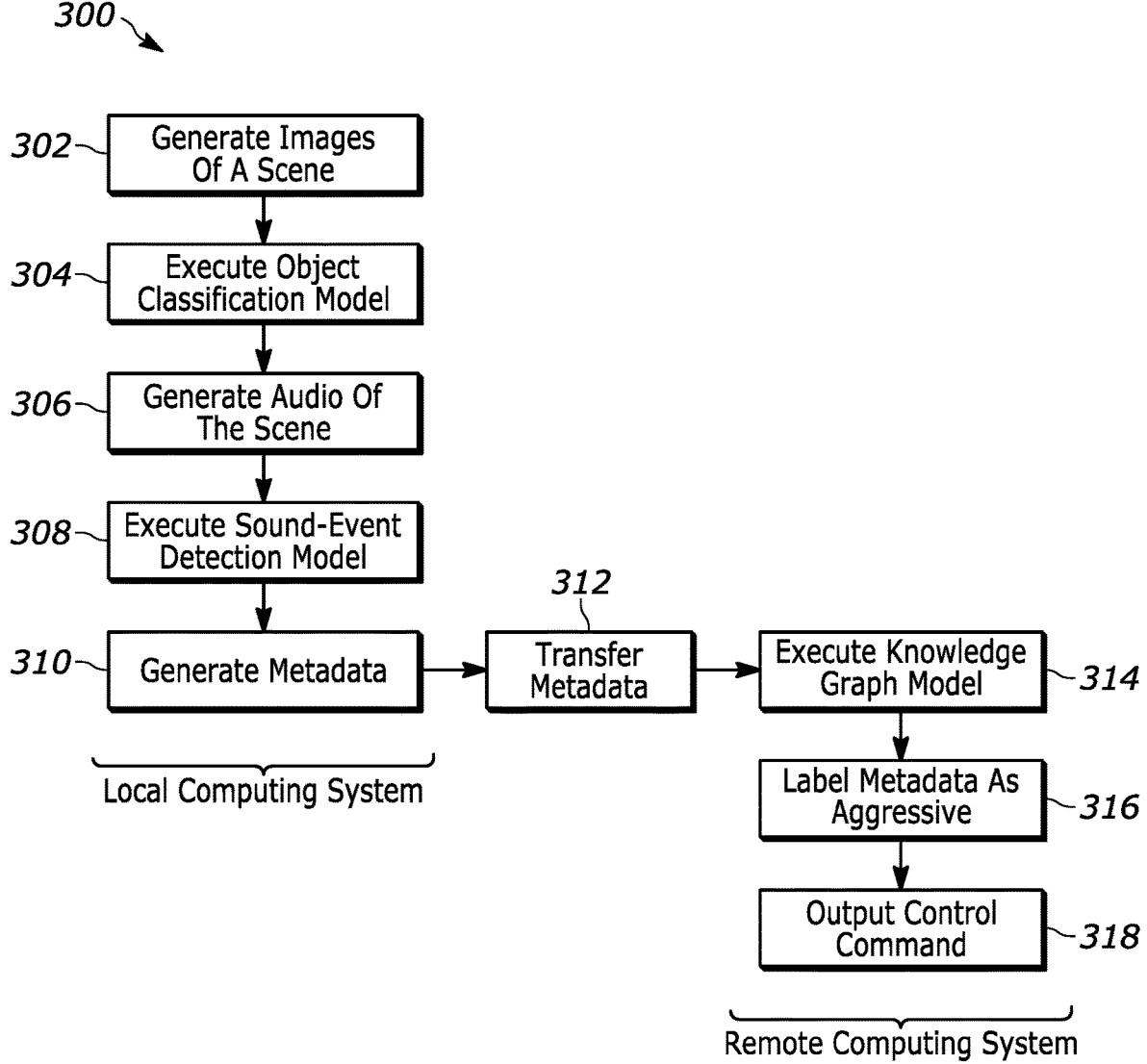
FIG. 3 is a flowchart of a method for predicting aggressive behavior associated with a surveillance scene, according to an embodiment.

FIG. 3 is a flowchart of a method 300 for predicting aggressive behavior associated with a surveillance scene, according to an embodiment. The method 300 can be executed and performed in part by the local computing system 102 and in part by the remote computing system 104.

At 302, the image sensor 110 generates images of a surveillance scene within the field of view of the image sensor. The image sensor may be a camera, for example. At 304, the object classification model 120 is executed on the generated images. The object classification model 120 is configured to predict one or more classes of objects in the surveillance scene (and, for example, a confidence score associated with that predicted class). As explained above, the class of the object can be a person, an object such as a weapon, or the like. This can also include a classification of that person, for example whether the person is acting erratic or aggressive based on his actions over time.

At 306, the audio sensor 112 generates audio of the surveillance scene. The audio sensor 112 can be located adjacent or local to the image sensor 110. At 308, the sound event detection model 118 is executed on the generated audio. The sound event detection model 118 is configured to predict one or more classes of events occurring in the surveillance scene (and, for example, a confidence score associated with that predicted class). As explained above, the class of the audio can be speech, yelling, the presence of certain keywords, glass breaking, an alarm sounding, or the like. This can also include a classification of that noise, such as whether it is deemed to be aggressive.

At 310, execution of these models 118, 120 results in the local computing system 102 generating metadata. This metadata can include the labels, the class prediction scores, and the like which is a byproduct or output of the models 118, 120. At 312, the metadata can be transferred from the local computing system 102 to the remote computing system 104, via, for example, communication system 124 and communication system 128 over network 126.

At 314, the remote computing system 104 executes a knowledge graph, such as the knowledge graph based query engine 134 on the metadata. The knowledge graph can be multimodal in that it includes nodes and edges that pertain to both the metadata associated with the audio data and that of the video. The knowledge graph outputs a prediction of whether the events in question are an aggressive act. As such, at 316 the metadata along with the actual underlying audio and/or video data can be labeled as aggressive. At 318, a control command can be output such as those described above (e.g., storing the metadata, commanding an alarm to sound, etc.).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for predicting aggressive behavior associated with a surveillance scene, the method comprising:

generating images of a surveillance scene via a camera;

via a local computing system local to the camera, executing an object classification model on the images, wherein the object classification model is configured to predict one or more classes of objects in the surveillance scene;

generating audio of the surveillance scene via a microphone;

via the local computing system, executing a sound-event detection model on the audio, wherein the sound-event detection model is configured to predict one or more classes of events occurring in the surveillance scene;

via the local computing system, generating metadata associated with the predicted one or more classes of objects and the predicted one or more classes of events, wherein the generated metadata includes a plurality of predicted classes, each of the plurality of predicted classes having an associated prediction score, and based on the prediction score the object classification model is configured to predict whether an identified person is acting in an out-of-the ordinary manner or anomalous fashion;

transferring the metadata to a remote computing system that is remote from the camera;

at the remote computing system, executing a knowledge graph on the metadata, wherein the knowledge graph is configured to implement knowledge graph-based reasoning to predict aggressive behavior occurring in the surveillance scene based on the metadata;

labeling the metadata associated with the predicted aggressive behavior as aggressive behavior occurring in the surveillance scene, wherein the labeling yields labeled metadata; and outputting a control command based on the labeled metadata.

2. The method of claim 1, further comprising:

receiving a query associated with information regarding the aggressive behavior occurring in the surveillance scene;

executing the knowledge graph based on the query; and responding to the query with spatiotemporal information associated with the aggressive behavior based upon the execution of the knowledge graph.

3. The method of claim 1, wherein the knowledge graph is configured to predict the aggressive behavior occurring in the surveillance scene based on spatiotemporal context as determined by the object classification model and the sound-event detection model.

4. The method of claim 1, further comprising:

receiving a request from a user searching for aggressive behavior occurring in the surveillance scene;

retrieving the labeled metadata in response to receiving the request; and displaying images of the surveillance scene associated with the labeled metadata.

5. The method of claim 1, wherein the control command is configured to generate an alarm indicating a presence of aggressive behavior in response to the knowledge graph predicting the aggressive behavior occurring in the surveillance scene.

6. The method of claim 1, further comprising:

retrieving the labeled metadata from the remote computing system;

using the labeled metadata as training data and training a machine learning model with the training data; and generating a trained machine learning model trained with the training data, wherein the trained machine learning model is configured to predict aggression in surveillance scenes.

7. The method of claim 1, wherein the predicted one or more classes of events includes at least one of screaming, laughing, gunshot, or fire alarm.

8. The method of claim 1, wherein the remote computing system includes an edge server, wherein the control command includes instructions to store the labeled metadata at the edge server for future access.

9. A system for predicting aggressive behavior associated with a surveillance scene, the system comprising:

an image sensor configured to generate images of a surveillance scene;

an audio sensor configured to generate audio of the surveillance scene;

a local computing system local to the image sensor and audio sensor, the local computing system configured to:

execute an object classification model on the images to predict one or more classes of objects in the surveillance scene, execute a sound-event detection model on the audio to predict one or more classes of events occurring in the surveillance scene, and generate metadata associated with the predicted one or more classes of objects and the predicted one or more classes of events, wherein the generated metadata includes a plurality of predicted classes, each of the plurality of predicted classes having an associated prediction score, and based on the prediction score the object classification model is configured to predict whether an identified person is acting in an out-of-the ordinary manner or anomalous fashion;

a remote computing system remote from the local computing system, the remote computing system configured to:

receive the metadata from the local computing system, execute a knowledge graph on the metadata, wherein knowledge graph-based reasoning is implemented to predict aggressive behavior occurring in the surveillance scene based on the metadata, label the metadata associated with the predicted aggressive behavior as aggressive behavior occurring in the surveillance scene, wherein the labeling yields labeled metadata, and output a control command based on the labeled metadata.

10. The system of claim 9, wherein the remote computing system is further configured to:

receive a query associated with information regarding the aggressive behavior occurring in the surveillance scene;

execute the knowledge graph based on the query; and respond to the query with spatiotemporal information associated with the aggressive behavior based upon the execution of the knowledge graph.

11. The system of claim 9, wherein the knowledge graph is configured to predict the aggressive behavior occurring in the surveillance scene based on spatiotemporal context as determined by the object classification model and the sound-event detection model.

12. The system of claim 9, wherein the remote computing system is further configured to:

receive a request from a user searching for aggressive behavior occurring in the surveillance scene;

retrieve the labeled metadata in response to receiving the request; and display images of the surveillance scene associated with the labeled metadata.

13. The system of claim 9, wherein the control command is configured to generate an alarm indicating a presence of aggressive behavior in response to the knowledge graph predicting the aggressive behavior occurring in the surveillance scene.

14. The system of claim 9, wherein the remote computing system is further configured to:

retrieve the labeled metadata from the remote computing system;

use the labeled metadata as training data and training a machine learning model with the training data; and generate a trained machine learning model trained with the training data, wherein the trained machine learning model is configured to predict aggression in surveillance scenes.

15. The system of claim 9, wherein the predicted one or more classes of events includes at least one of screaming, laughing, gunshot, or fire alarm.

16. The system of claim 9, wherein the remote computing system includes an edge server, and the control command includes instructions to store the labeled metadata at the edge server for future access.

17. A system comprising:

an image sensor configured to generate images of a surveillance scene;

an audio sensor configured to generate audio of the surveillance scene; and a plurality of processors coupled to a plurality of non-transitory computer-readable storage mediums that collectively store programming instructions for execution by the plurality of processors, wherein the programming instructions cause the plurality of processors to:

execute an object classification model on the images to predict one or more classes of objects in the surveillance scene, execute a sound-event detection model on the audio to predict one or more classes of events occurring in the surveillance scene, generate metadata associated with the predicted one or more classes of objects and the predicted one or more classes of events, wherein the generated metadata includes a plurality of predicted classes, each of the plurality of predicted classes having an associated prediction score, and based on the prediction score the object classification model is configured to predict whether an identified person is acting in an out-of-the ordinary manner or anomalous fashion, execute a knowledge graph on the metadata, wherein knowledge graph-based reasoning is implemented to predict aggressive behavior occurring in the surveillance scene based on the metadata, label the metadata associated with the predicted aggressive behavior as aggressive behavior occurring in the surveillance scene, wherein the labeling yields labeled metadata, and output a control command based on the labeled metadata.

18. The system of claim 17, wherein the plurality of processors includes (a) a local processor local to the image sensor and audio sensor, and (b) a remote server processor remote from the image sensor and audio sensor;

wherein the local processor is configured to execute the object classification model, execute the sound-event detection model, and generate the metadata;

wherein the remote server processor is configured to execute a knowledge graph, label the metadata, and output the control command.

\* \* \* \* \*